i
US008763347B2

(12) United States Patent
Anderson et al.

(10) Patent No.: US 8,763,347 B2
(45) Date of Patent: Jul. 1, 2014

(54) APPARATUS FOR MANUFACTURING A METAL FRAMING MEMBER

(76) Inventors: Jeffrey A. Anderson, Bellevill, MI (US);
Douglas B. Anderson, Perry, MI (US);
David L. Anderson, Perry, MI (US);
Scott J. Anderson, Lansing, MI (US)

( * ) Notice: Subject to any disclaimer, the term of this patent is extended or adjusted under 35 U.S.C. 154(b) by 0 days.

(21) Appl. No.: 13/576,351

(22) PCT Filed: Feb. 1, 2011

(86) PCT No.: PCT/US2011/023367
§ 371 (c)(1),
(2), (4) Date: Mar. 21, 2013

(87) PCT Pub. No.: WO2011/094744
PCT Pub. Date: Aug. 4, 2011

(65) Prior Publication Data
US 2013/0167476 A1 Jul. 4, 2013

Related U.S. Application Data

(60) Provisional application No. 61/300,286, filed on Feb. 1, 2010, provisional application No. 61/300,283, filed on Feb. 1, 2010.

(51) Int. Cl.
*E04C 3/00* (2006.01)
(52) U.S. Cl.
USPC ............................................. 52/846; 52/843
(58) Field of Classification Search
USPC ........................................ 52/837, 843, 846
See application file for complete search history.

(56) References Cited

U.S. PATENT DOCUMENTS

| 2,052,024 A | 8/1936 | Hahn |
| 2,703,003 A | 3/1955 | Ruppel |
| 3,034,197 A | 5/1962 | Watanabe |
| 3,094,197 A | 6/1963 | Attwood |
| 3,465,406 A | 9/1969 | Myers |
| 3,477,187 A | 11/1969 | Fruman |
| 3,648,426 A | 3/1972 | Chaudhary |
| 3,812,558 A | 5/1974 | Watanabe |

(Continued)

FOREIGN PATENT DOCUMENTS

| DE | 3336378 | 2/1985 |
| EP | 0 136 618 | 4/1985 |
| GB | 1196914 | 7/1970 |
| SU | 586246 | 1/1978 |

OTHER PUBLICATIONS

International Search Report and Written Opinion from PCT/US2011/23367 mailed Mar. 29, 2011.

(Continued)

*Primary Examiner* — Mark Wendell
(74) *Attorney, Agent, or Firm* — Steptoe & Johnson LLP

(57) ABSTRACT

In one aspect, an apparatus for manufacturing a framing member can include a translation path for transporting a metal sheet. The translation path can include a translation axis, a first set of rollers, which can include a plurality of first bottom rollers and a plurality of first top rollers, the first set of rollers can have a first centerline, and a second set of rollers, which can include a plurality of second bottom rollers and a plurality of second top rollers, the second set of rollers can have a second centerline, line, where the first centerline and the second centerline can extend away from the translation axis at an angle in the direction of translation.

26 Claims, 10 Drawing Sheets

(56) References Cited

U.S. PATENT DOCUMENTS

| | | |
|---|---|---|
| 4,016,700 A | 4/1977 | Blomstedt |
| 4,016,701 A | 4/1977 | Beynon |
| 4,617,770 A | 10/1986 | Hickman |
| 4,619,098 A | 10/1986 | Taylor |
| 4,697,393 A | 10/1987 | Madray |
| 4,793,113 A | 12/1988 | Bodnar |
| 4,811,539 A | 3/1989 | Menchetti |
| 4,862,667 A | 9/1989 | Melland |
| 5,001,017 A | 3/1991 | Alhamad et al. |
| 5,093,971 A | 3/1992 | Hein |
| 5,095,597 A | 3/1992 | Alhamad et al. |
| 5,134,825 A | 8/1992 | Berridge |
| 5,297,416 A | 3/1994 | Alhamad et al. |
| 5,402,852 A | 4/1995 | Alhamad et al. |
| 5,467,566 A | 11/1995 | Swartz et al. |
| 5,527,625 A | 6/1996 | Bodnar |
| 5,551,135 A | 9/1996 | Powers |
| 5,575,339 A | 11/1996 | Alhamad |
| 5,605,024 A | 2/1997 | Sucato et al. |
| 5,664,380 A | 9/1997 | Hsueh |
| 5,738,175 A | 4/1998 | Alhamad |
| 5,778,626 A | 7/1998 | Hellsten |
| 5,816,332 A | 10/1998 | Alhamad |
| 5,913,788 A | 6/1999 | Herren |
| 5,927,041 A | 7/1999 | Sedlmeier et al. |
| 5,950,385 A | 9/1999 | Herren |
| 6,050,048 A | 4/2000 | Hellsten |
| 6,062,316 A | 5/2000 | Alhamad |
| 6,089,325 A | 7/2000 | Alhamad |
| 6,117,062 A | 9/2000 | Alhamad |
| 6,199,336 B1 | 3/2001 | Poliquin |
| 6,205,740 B1 | 3/2001 | Ekerholm et al. |
| 6,212,744 B1 | 4/2001 | Inanobe et al. |
| 6,349,774 B2 | 2/2002 | Alhamad |
| 6,381,916 B1 | 5/2002 | Maisch et al. |
| 6,612,090 B1 | 9/2003 | Corden |
| 6,637,159 B1 | 10/2003 | Heath |
| 6,699,563 B1 | 3/2004 | Alhamad |
| 6,729,096 B1 | 5/2004 | Asmore et al. |
| 7,257,932 B2 | 8/2007 | Ng |
| 7,464,574 B2 | 12/2008 | Durney et al. |
| 7,819,185 B2 | 10/2010 | Shuster |
| 8,084,117 B2 | 12/2011 | Lalvani |
| 8,234,836 B2 | 8/2012 | Anderson |
| 2006/0016148 A1 | 1/2006 | Anderson |
| 2007/0113614 A1 | 5/2007 | Durney et al. |
| 2007/0122590 A1 | 5/2007 | Lalvani |
| 2008/0115931 A1 | 5/2008 | Shuster |

OTHER PUBLICATIONS

International Preliminary Report on Patentability dated Aug. 16, 2012 for PCT/US2011/023367.

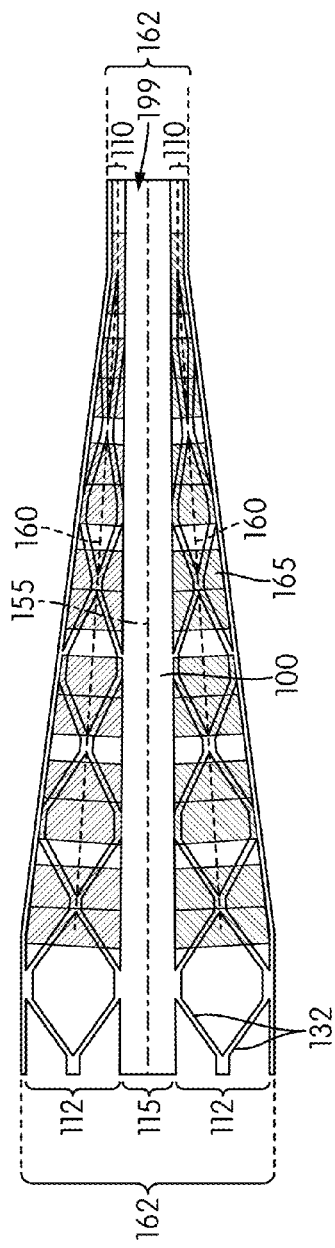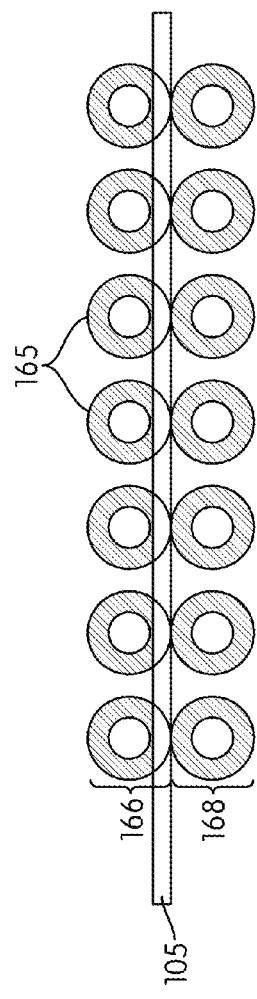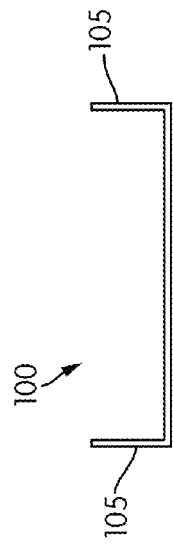

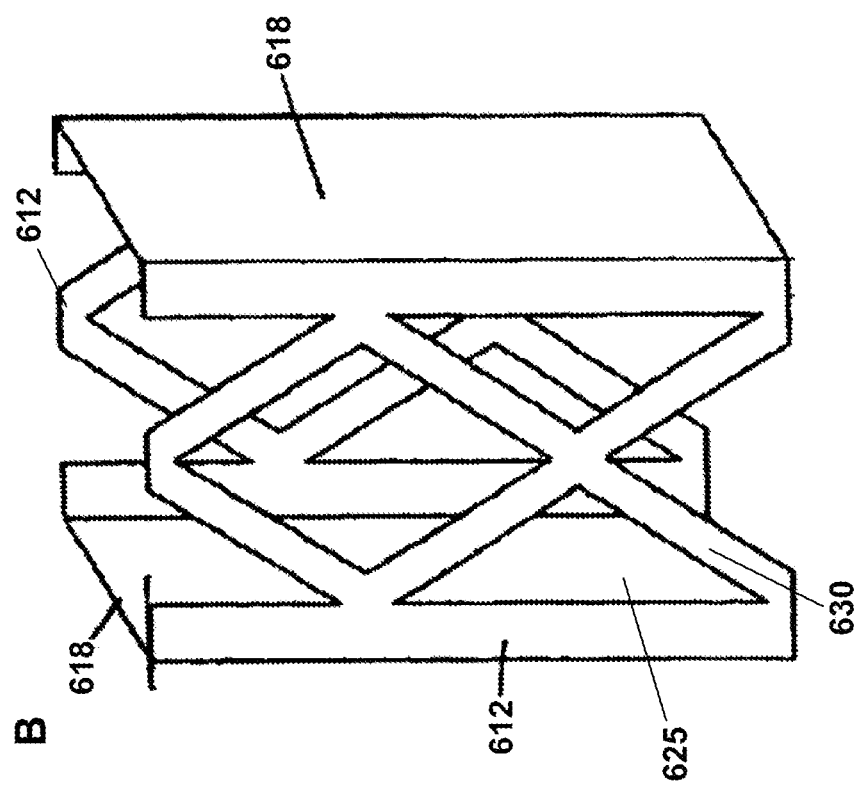
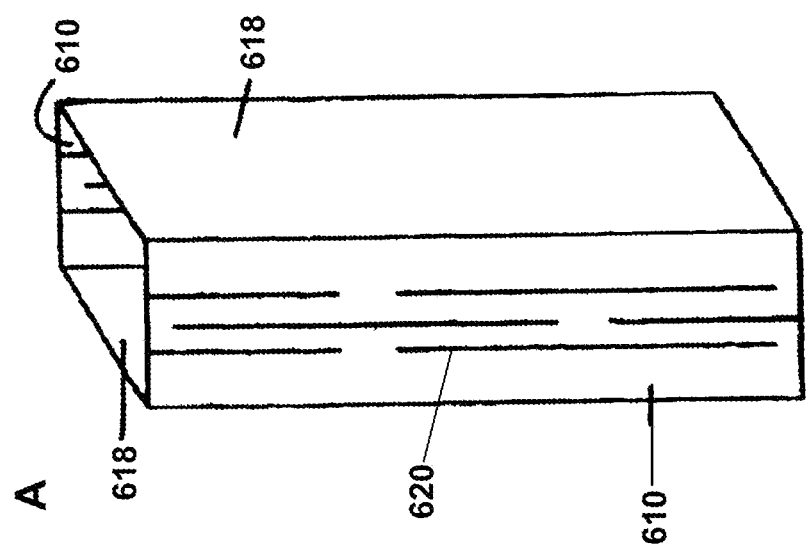
FIG. 6

APPARATUS FOR MANUFACTURING A METAL FRAMING MEMBER

CLAIM OF PRIORITY

This application claims priority under 35 USC 371 to International Application No. PCT/US2011/023367, filed on Feb. 1, 2011, which claims priority to U.S. Provisional Application Ser. No. 61/300,286, filed Feb. 1, 2010, and U.S. Provisional Application Ser. No. 61/300,283, filed Feb. 1, 2010, each of which is incorporated by reference in its entirety.

TECHNICAL FIELD

The invention relates to an apparatus for manufacturing building materials, and more particularly to a metal framing member for structural and non-structural building applications.

BACKGROUND

The use of light gauge metal framing members for structural and non structural applications has grown in the residential and light commercial building industry due, in part, to volatile lumber costs and the inconsistent and unpredictable quality of wood studs. Although the use of metal in framing applications has increased over the last few years, a few issues have resulted in the rate of growth being inhibited. For example, the cost of steel has risen significantly. To offset rising cost of material, the producers have reduced the material thickness. The thickness reduction has exacerbated the negative effects of the thinner and more flexible metal. These negative effects have prohibited further material thickness reduction opportunities.

SUMMARY

In one aspect, an apparatus for manufacturing a framing member can include a translation path for transporting a metal sheet. The translation path can include a translation axis, a first set of rollers, which can include a plurality of first bottom rollers and a plurality of first top rollers, the first set of rollers can have a first centerline, and a second set of rollers, which can include a plurality of second bottom rollers and a plurality of second top rollers, the second set of rollers can have a second centerline, where the first centerline and the second centerline can extend away from the translation axis at an angle in the direction of translation.

In some embodiments, the angle between the first centerline and the translation axis can be substantially equal to the angle between the second centerline and the translation axis.

In some embodiments, the apparatus can further include a mandrel, which can include a shaped profile including four sides and two ends, where a first side and a second side can be opposite each other and at least one of the first side or the second side can extend away from the longitudinal axis of the profile at an angle. A plurality of small bearing micro rollers can be mounted on at least one side of the shaped profile.

In another aspect, a mandrel for forming a metal framing member can include a shaped profile. The shaped profile can include four sides and two ends. A first side and a second side of the shaped profile can be opposite each other and at least one of the first side or the second side can extend away from the longitudinal axis of the profile at an angle. A plurality of small bearing micro rollers can be mounted on at least one side of the shaped profile.

In some embodiments, a plurality of small bearing micro rollers can be mounted on all four sides of the shaped profile.

In some embodiments, the mandrel can further include a metal strip, wherein the metal strip can be positioned at a location on the mandrel where heat transfer can be required.

In some embodiments, a third side and a fourth side of the shaped profile can be opposite each other and at least one of the third side or the fourth side can extend away from the longitudinal axis of the profile at an angle.

In another aspect, a system for expanding a metal framing member can include a mandrel. A mandrel can include a shaped profile, which can include four sides and two ends, where a first side and a second side of the shaped profile can be opposite each other and at least one of the first side or the second side can extend away from the longitudinal axis of the profile at an angle, and a set of pull-out rollers, which can include a plurality of outer drive rollers and a plurality of inner drive rollers. The plurality of outer drive rollers can be arranged to pull a preformed tubular metal sheet over the mandrel. A plurality of small bearing micro rollers can be mounted on at least one side of the shaped profile.

In another aspect, a method of manufacturing a framing member can include producing two flanges on a metal sheet, where the metal sheet can include at least one pre-web region, at least two leg regions, four edges and a length, where the two edges can be parallel to the length and each flange can be on each of two of the edges, creating a plurality of slits in the at least one pre-web region of the metal sheet, expanding the plurality of slits in the at least one pre-web region to form at least one web region, the at least one web region can include a web element and at least one web void, and forming the metal sheet, which can include the at least one web region into a framing member, where during forming the metal sheet into a framing member a leg region can be formed into a leg, and where the framing member can consist only of the metal sheet and the framing member can include two legs and at least one web region.

In some embodiments, expanding the plurality of slits can include expanding when the metal sheet is at a temperature below about 100° C.

In some embodiments, forming the metal sheet into the framing member can include joining opposite edges of the metal sheet to form a tubular framing member. The framing member can include a leg region formed from the two flanges of the metal sheet.

In some embodiments, a method can further include joining the two flanges to form one leg of the tubular framing member. Joining the two flanges can include welding the flanges to form the leg region.

In some embodiments, the tubular framing member can include two web regions. In some embodiments, a method can further include modifying a portion of the metal sheet to include a reinforcement. The modified portion of the metal sheet can consist only of the metal sheet. In some circumstances, modifying a portion of the metal sheet can include producing a flange, dimple or dart in the metal sheet. The portion of the metal sheet that is modified can include a leg region. The portion of the metal sheet that is modified includes a web region. In some embodiments, a method can further include modifying a portion of the tubular framing member to include a reinforcement.

In some embodiments, a method can further include heat treating the framing member.

In some embodiments, a method can further include applying pressure to the leg regions to lengthen leg regions. In some circumstances, expanding the slits and applying pressure to the metal sheet can occur substantially simultaneously.

In some embodiments, a leg region can be substantially at the centerline of the metal sheet.

In some embodiments, expanding the slits in a pre-web region can occur in a direction which is different than a direction of translation of the metal sheet.

In some embodiments, a first web element from a first web region can be joined to a second web element from a second web region.

In another aspect, a method of manufacturing a framing member can include creating a plurality of slits in the at least one pre-web region of a metal sheet, where the metal sheet can include at least one pre-web region, at least two leg regions, four edges and a length, forming the metal sheet into a framing member, where during forming the metal sheet into a framing member a leg region can be formed into a leg, and where the framing member can consist only of the metal sheet and the framing member can include two legs and at least one pre-web region, and expanding the plurality of slits in the at least one pre-web region of the framing member to form at least one web region, the at least one web region can include a web element and at least one web void.

In some embodiments, the framing member can be a tubular framing member.

In some embodiments, the slits can be expanded by being drawn over an internal mandrel inside the tubular framing member.

In some embodiments, the tubular framing member can be heated. The leg regions can be lengthened after the tubular framing member is heated.

In another aspect, a method of manufacturing a framing member can include producing two flanges on a metal sheet, where the metal sheet can include two pre-web regions, at least two leg regions, four edges and a length, where the two edges can be parallel to the length and each flange can be on each of two of the edges, creating a plurality of slits in the two pre-web regions of the metal sheet, expanding the plurality of slits in a first pre-web region to form a first web region, the first web region can include a web element and at least one web void, and expanding the plurality of slits in a second pre-web region to form a second web region, the second web region can include a web element and at least one web void, and forming the metal sheet, which can include the two web regions into a framing member, where during forming the metal sheet into a framing member a leg region can be formed into a leg, and where the framing member can consist only of the metal sheet and the framing member can include two legs and two web regions.

In some embodiments, expanding the plurality of slits in the first pre-web region and expanding the plurality of slits in the second pre-web can occur substantially simultaneously. In other embodiments, expanding the plurality of slits in the first pre-web region and expanding the plurality of slits in the second pre-web can occur sequentially.

In another aspect, a tubular metal framing member can consist of one formed metal sheet, where the formed metal sheet can include two leg regions, and two web regions, where each web region can include a web element and at least one web void, where the web element of the first web region can be joined to the web element of the second web region.

In some embodiments, the leg can include a flange, dimple or dart.

In some embodiments, the web region can include a flange, dimple or dart.

In some embodiments, the web element of the first web region can be joined with the web element of the second web region at more than one point.

In some embodiments, the web element of the first web region includes a weld joint to the web element of the second web region.

In another aspect, a method of building a structure can include placing a tubular framing member in a portion of a structure. The tubular framing member can consist of one formed metal sheet, where the formed metal sheet can include two leg regions, and two web regions, where each web region can include a web element and at least one web void, where the web element of the first web region can be joined to the web element of the second web region. The method can further include installing wiring, plumbing or a heating duct through at least one web void of the tubular framing member. The method can further include installing insulation, sound barrier material or thermal barrier material in the tubular framing member.

BRIEF DESCRIPTION OF THE FIGURES

FIG. 1A is a top view of an apparatus.
FIG. 1B is a side view of an apparatus.
FIG. 1C is an end view of a metal sheet with flanges.
FIG. 6 is a perspective view of a preformed metal sheet.

DETAILED DESCRIPTION

Figure 2A:
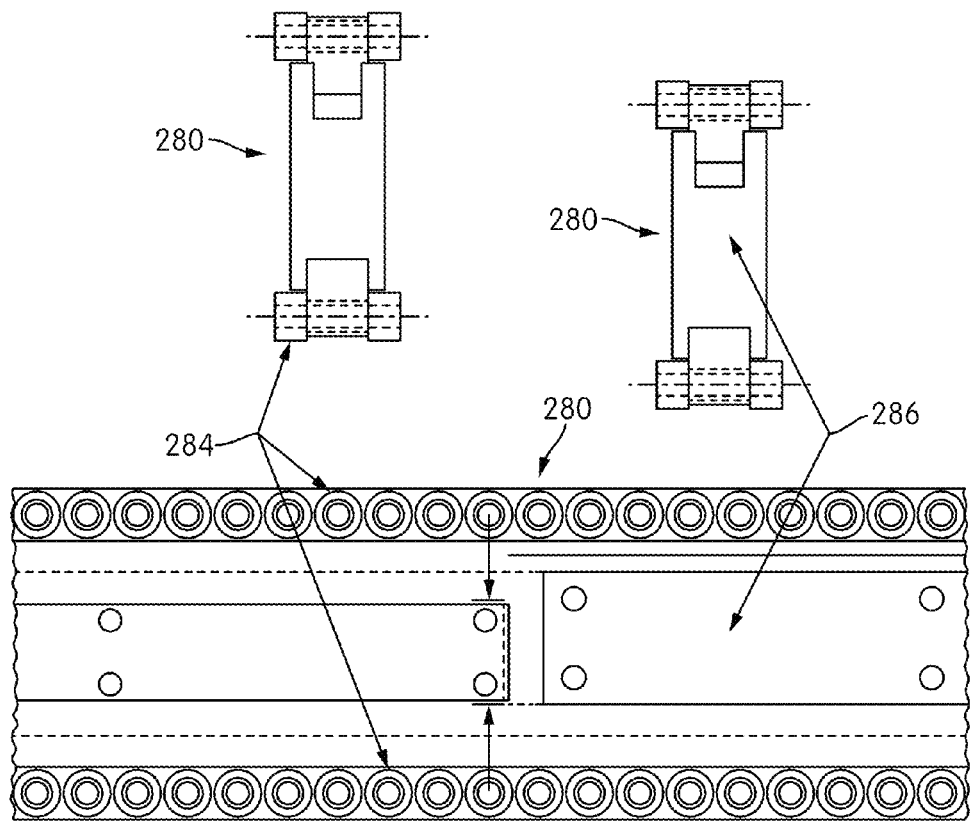
FIG. 2A is a section view of a mandrel.

Certain aspects of steel framing members are described, for example, in U.S. application Ser. No. 12/395,934, filed Mar. 2, 2009, U.S. Application No. 61/032,195, filed Feb. 28, 2008, U.S. application Ser. No. 10/633,694, filed Aug. 5, 2003, and U.S. Application No. 60/401,084, filed Aug. 5, 2002, each of which is incorporated by reference in its entirety.

One type of framing member can be the current steel drywall stud. The current steel drywall stud can be a C-Section design that has a long history of use in both commercial and residential construction. To decrease the cost of the stud, manufacturers have reduced the material thickness in half and doubled the yield strength. Reducing the material thickness and doubling the yield strength can cause several problems. As the materials become thinner, the modulus can decrease and flexibility of the final part can increase, regardless of the yield strength. The increased strength of the material can make it more difficult to customize the stud as required for normal construction. For the workforce that installs the part, it can result in lost productivity, added time and labor to install screws, and an increased cost to construct wall.

Along with the installation issues, the C-section stud also can have shortcomings that can make it less desirable for applications where sound attenuation is required and/or thermal transfer is a concern. The solid steel wall or web that connects the two drywall mounting surfaces can transmit both thermal energy and sound very well, resulting in a wall with a low R-value.

Several attempts have been made to create a C-section stud that has easier access for the trades and also reduces thermal conductivity. The resulting studs were all achieved at added cost to the product. Although none of these issues with the C-section may be severe enough to render the product unusable, they can result in added costs to the installers and added ongoing costs to the owners of the building through unnecessary energy expenses.

Therefore, a need exists for a framing member with torsional and material strength that can be manufactured using a minimal amount of material and at a reduced cost.

In one aspect, an apparatus for manufacturing a framing member can include a translation path 162 for transporting a metal sheet 100 (FIG. 1A). During manufacturing a metal sheet 100 can change dimensions. For example, the width of the metal sheet can increase due to compression forming or expansion. The width of the metal sheet can also increase as the material of the metal sheet is thinned. As the width of the metal sheet increases the width of the translation path 162 can also increase.

The translation path 162 can include a translation axis 155, also called the direction of material flow (FIG. 1A). The translation axis 155 can be an imaginary line that represents the center of the translation path 162. The translation axis 155 does not change as the width of the translation path 162 changes; rather, as the width of the translation path 162 changes, the translation axis 155 can remain at the center of the translation path 162.

The apparatus can include a first set of rollers 165 (FIGS. 1A and 1B). A first set of rollers 165 can include a plurality of first bottom rollers 168 and a plurality of first top rollers 166 (FIG. 1B). The first set of rollers 165 can have a first centerline. The centerline of a first set of rollers 165 can align with the centerline of expansion 160 (FIG. 1A). A metal sheet 100 can traverse between a plurality of bottom rollers 168 and a plurality of first top rollers 166 (FIG. 1B).

The apparatus can also include a second set of rollers 165 (FIGS. 1A and 1B). A second set of rollers 165 can include a plurality of second bottom rollers 168 and a plurality of second top rollers 166 (FIG. 1B). The second set of rollers 165 can have a second centerline. The centerline of a second set of rollers 165 can align with the centerline of expansion 160 (FIG. 1A). A metal sheet 100 can pass between a plurality of bottom rollers 168 and a plurality of top rollers 166 (FIG. 1B).

A roller can be a device that rotates. A roller can include a cylinder that can spin around shaft or a sphere. A set of rollers can apply a force to a metal sheet. For example, a set of rollers can provide a force to push a metal sheet along the translation path, can apply a force to the metal sheet to expand the metal sheet, or can apply a force to the thin the material of a metal sheet.

As a metal sheet 100 passes between a first set of rollers and a second set of rollers, the metal sheet 100 can have a region which expand, for example, a pre-web region 110 (FIG. 1A). A pre-web region 110 can enter into a set of rollers 165 and expand while traversing the set of rollers to form a web region 112. Therefore, at different points along the set of rollers, the metal sheet can include either a pre-web region 110 or a web region 112, depending on whether expansion of the pre-web region has occurred. A first pre-web/web region 110/112 can traverse through a first set of rollers. A second pre-web/web region 110/112 can traverse through a second set of rollers. The center 160 of a pre-web/web region 110/112 can align with the centerline of a set of rollers. As a pre-web region 110 expands, the center 160 of a pre-web/web region 110/112 can move laterally away from the translation axis 155. Therefore, the first centerline 160 and the second centerline 160 can extend away from the translation axis 155 at an angle in the direction of translation 199. In some embodiments, the angle between the first centerline 160 and the translation axis 155 can be substantially equal to the angle between the second centerline 160 and the translation axis 155. The angle can be between 5 and 45 degrees.

Figures 2B, 2C, 2D:
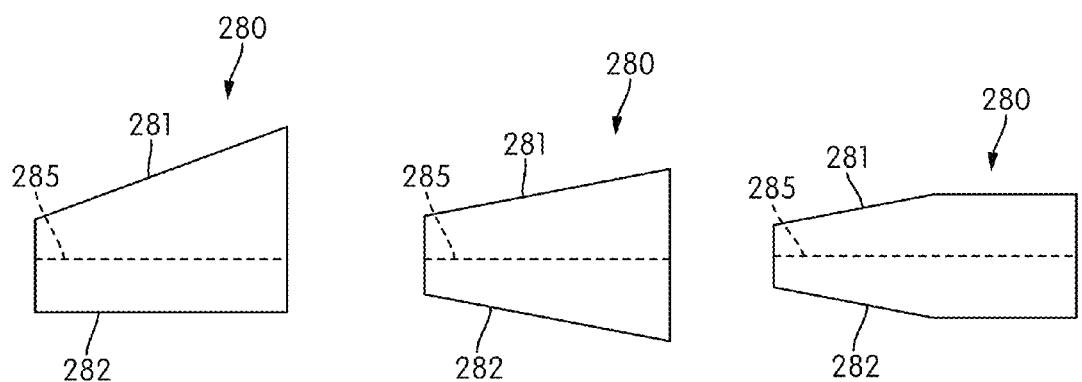
FIG. 2B is a side view of a mandrel.
FIG. 2C is a side view of a mandrel.
FIG. 2D is a side view of a mandrel.

In some embodiments, the apparatus can further include a mandrel 280 (FIG. 2A), which can include a shaped profile 286 including four sides and two ends, where a first side 281 and a second side 282 can be opposite each other and at least one of the first side 281 or the second side 282 can extend away from the longitudinal axis 285 of the profile at an angle (FIG. 2B). In some embodiments, both the first side 281 and a second side 282 can extend away from the longitudinal axis 285 of the shaped profile at an angle. In other words, the mandrel 285 can be thinner at one end and thicker at the other end with first side 281 and second side 282 extending away from a centerline (FIG. 2C). In some embodiments, a first side 281 and a second side 282 of the mandrel 285 can extend away from the longitudinal axis of the profile at an angle and then level off such that the first side and the second side of the shaped profile are parallel with the longitudinal axis of the profile (FIG. 2D).

In some embodiments, a third side and a fourth side of the shaped profile can be opposite each other. At least one of the third side or the fourth side can extend away from the longitudinal axis of the profile at an angle.

The profile can determine the timing and rate of expansion on the legs as a metal sheet, preformed metal sheet or framing member is drawn over the mandrel. For example, the angle at which a side extends away from the longitudinal axis of the profile can be shallow or steep. The angle between the side and the longitudinal axis of the profile can be from about 0 to about 45 degrees, from about 5 to about 30 degrees, from about 5 to about 20 degrees. The shaped profile can be customized.

The process of expansion can create a lot of force onto the mandrel and the friction level can be high. These high friction levels can prevent the framing member from being formed without damage. To achieve the low friction required to minimize damage to the part during the expansion process, the mandrel can have a series of small bearing mounted micro rollers 284 that can be on the top and bottom of a custom shaped profile (FIG. 2A).

A plurality of small bearing micro rollers 284 can be mounted on at least one side of the shaped profile. In some embodiments, a plurality of small bearing micro rollers 284 can be mounted on all four sides of the shaped profile. The small bearing micro rollers 284 can be on any surface of a mandrel that is in contact with a metal sheet, a preformed metal sheet or a tubular framing member.

The small bearing micro rollers 284 can reduce the amount of friction on the metal sheet, preformed metal sheet or tubular framing member. A small bearing micro roller can include a plurality of small bearings so that the roller spins more freely. A small bearing micro roller can also be smaller than one inch.

In some embodiments, the mandrel can further include a metal strip (not shown). The metal strip can be positioned at a location on the mandrel where heat transfer can be required. In some embodiments, in the sections where heating of the part is required, the rollers can be replaced with a thin strip of metal as to prevent interference with the heating process. Under some conditions, a metal sheet, a preformed metal sheet or tubular framing member may need to be heated. For example, a metal sheet, a preformed metal sheet or tubular framing member can be heated to reduce the yield strength of the material of the a metal sheet, a preformed metal sheet or tubular framing member in order to thin the material or expand regions of the metal sheet, e.g., a pre-web region. A metal sheet, a preformed metal sheet or tubular framing member can also be heated during heat treatment.

The advantages of a mandrel, as described, can include that low friction can be required during the expansion process. Low friction can be achieved through the use of bearing mounted rollers in areas that contact the metal sheet, preformed metal sheet or a framing member. Another advantage can be that the mandrel can contribute to, or at least not attenuate, heating of the metal sheet, preformed metal sheet or framing member by including metal strips that can replace rollers in heating sections.

Figure 3:
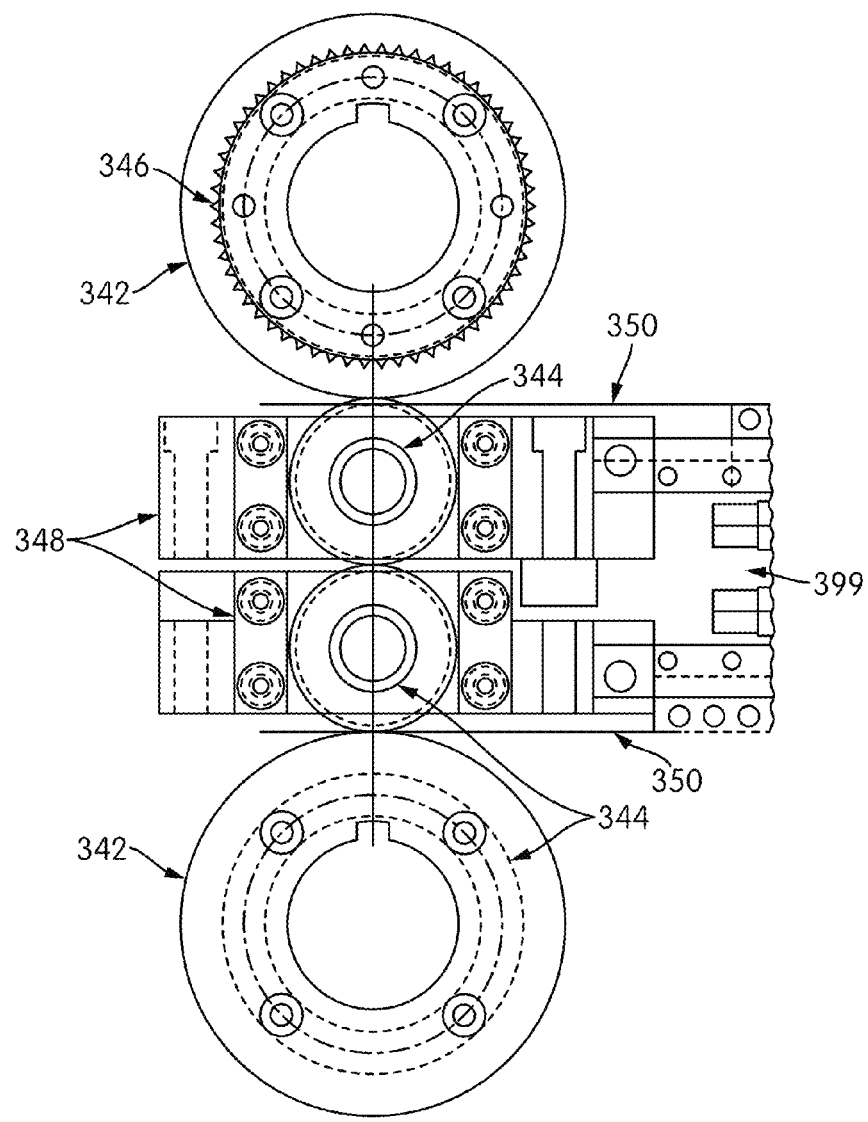
FIG. 3 is a side view of a set of pull-out rollers.

In another aspect, a system for expanding a metal framing member can include a mandrel 280 and a set of pull-out rollers 342/344. The set of pull-out rollers 342/344 can include a plurality of outer drive rollers 342 and a plurality of inner drive rollers 344 (FIG. 3). The plurality of outer drive rollers can be arranged to pull a preformed tubular metal sheet 350 over the mandrel.

A set of pull-out rollers 342/344 can provide the drive required to keep the metal sheet, preformed metal sheet or framing member in tension throughout the expansion process. Without the metal sheet, preformed metal sheet or framing member being in tension, it may not be able to be formed over the mandrel. The outer drive rolls can pull the material over the mandrel.

The drive rolls can be synchronized with the speed of the apparatus to make sure the metal sheet, preformed metal sheet or framing member is always in tension. The inner drive 344 rolls can be adjustable to set the final height of the part. The alignment of the shaft centerlines of the drive rolls and the drive rolls can be critical to providing the traction required to keep the part in tension and also pierce the material. The outer drive roll can provide the piercing 346, which can be required for quick and easy puncturing, as described in U.S. application Ser. No. 12/395,934, which is incorporated by reference in its entirety.

Construction materials generally have become thinner and yield strengths have increased to be cost competitive. The significantly flat shape of the legs and the C-section design can result in a structure incapable of performing as required. The creation of an expanded tubular framing member can require a unique design to the cold forming process. The center of the blank may not be expanded as in the previous C-section patents. Instead of one pre-web region that flows down the center of the apparatus, the tubular design can have two pre-web regions that flow away from center of the apparatus. In order to create an even expansion of each of the two pre-web regions, the centerline of a set rollers in the apparatus follow the centerline of the expanded material, as explained above, and the axis of the roll can be perpendicular to the centerline of expansion.

In another aspect, a method can be for manufacture a framing member. A framing member can be manufactured by expanding metal in a pre-web region, a leg region, or both, during the manufacturing process. Slits can be formed in a pattern such that the region can be expanded during the manufacturing process. The expansion can create the web voids and web elements that extend in at least one dimension of the framing member. The web voids can create thermal resistance, which can reduce the thermal conductivity of the member and can improve the R-value of the ultimate structure. Because the metal is expanded, there can be little or no scrap metal produced during manufacture. A method can be a cold forming process or a warm forming process.

A cold forming process can be used to manufacture a metal framing member. The framing member can be a tubular framing member. During a cold forming process, a progression of rollers can be used to reduce the thickness of the material, in particular, the leg regions. This thickness reduction can produce longer legs as required for the design and can allow the expansion of the two mounting surfaces of the member as desired.

Cold forming can have several potential advantages over the warm forming, including reduced energy consumption during the manufacturing process, lower capital expense and overall simplified process that may allow higher speed production rates.

Figure 8:
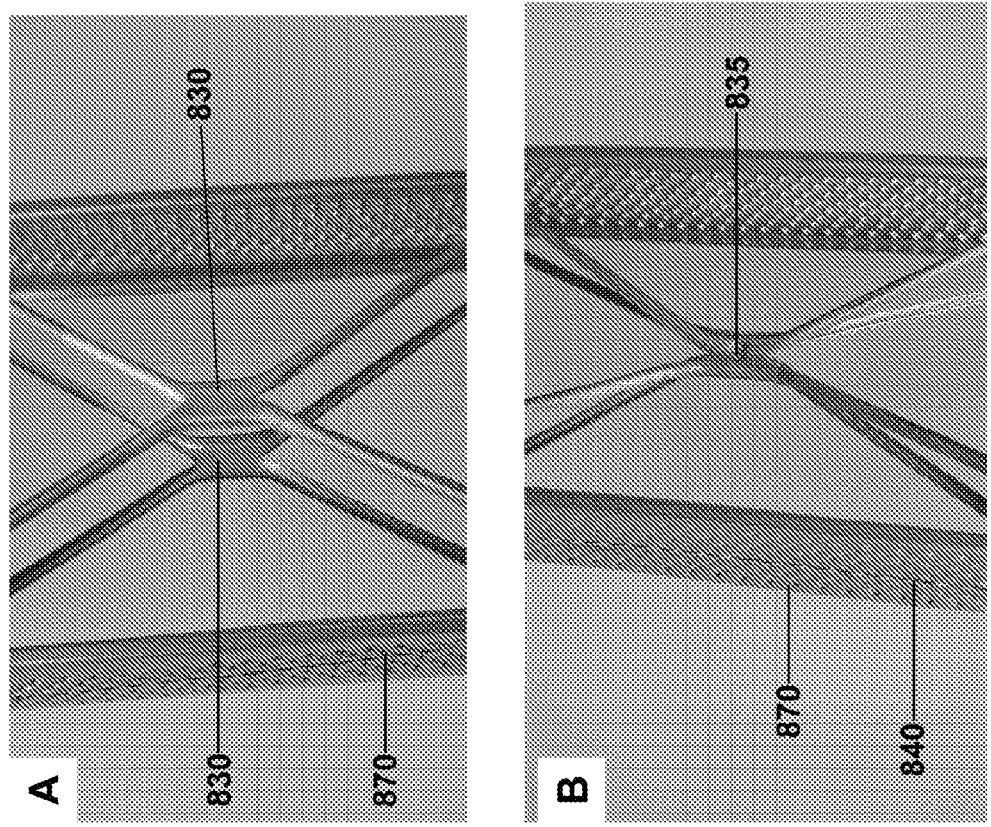
FIG. 8A is a perspective view of a tubular framing member.
FIG. 8B is a perspective view of a tubular framing member with a center weld.

A method of manufacturing a framing member can include feeding a metal sheet 100, also called a metal strip or a blank, into a series of rollers 165 that can produce upturned flanges 105 on the edges of the sheet 100 (FIGS. 1A, 1B and 1C). The upturned flanges can be at approximately 90 degrees from the sheet 100. A plurality of intermittent slits can be produced (see 420, FIG. 4C, for example). The shape and spacing of the slits can be based on the particular part design. The flanged and slit material can be driven through a series of rollers that can expand the overall metal sheet with pressure on the sized rolls that can reduce and can lengthen the legs at the same time (FIGS. 1A and 1B). The flanged edge of the metal sheet 105 can be pulled open with the use of a channel or rollers that keep tension on the blank, while simultaneously compressing and lengthening the legs (FIG. 1A). An alternative method could be to prevent the lengthening legs from warping vertically and forcing the blank to expand horizontally eliminating the need for the channels or rollers. If required, the blank can be subject to a series of leveling rollers and/or stretching rollers to flatten and remove residual internal stress that can result from the reducer/expander operation. The mostly flat blank can then be flanged with a set(s) of rollers that can be synchronized and cut to match the blank profile (FIGS. 5B-5D). The set(s) of rollers can impart a shape such as a flanged edge to create a substantially strengthened leg (see 870, FIGS. 8A and 8B, for example). A series of rollers can complete the final shape of a tube to be seam welded 840 (FIG. 8B). These rolls can create a rectangular shape (FIG. 8A) or can create an hourglass shape, if it is intended to have center web welding (FIG. 8B). The part can then be welded in whatever technology is desired to create a tubular shape.

The one piece tubular framing member design can requires significant redesign of the operation process from the prior art. In the prior art, there is only one set of slits that can be expanded and the center web can be in line with the center of the apparatus, resulting in a mostly symmetrical expansion of the blank. The shafts can be perpendicular with the centerline of the apparatus resulting in a relatively simplistic manufacturing condition.

The tubular expanded framing member can have twice the number of slits. These slits can be expanded in a manner that does not follow the center of the apparatus 155 (FIG. 1A). The centerlines of each of the two sets of rollers 160 can fan out away from the apparatus centerline 155 at an angle. This can require that the rolls are no longer perpendicular to the apparatus requiring a radial reduction/expansion process. The angle of the radial expansion/reduction can be dependent on the mechanical properties of the materials used, width of the beginning and final blank desired, and number of passes used.

Substantial flanging on legs can be required to meet design loads on part as compared to prior art. At the point of exit, the material can be mostly flat and can have no shape that will strengthen the legs to handle the expected loads imparted during the construction process. A matched and geared timed flanging tool can be incorporated into the process to create the appropriate flange design on the tool. Shape can be added to the leg to create a stronger design. This shape can be any forming that creates strength to resist applied loads either axial and laterally as a result of installation or ongoing design loads. The current technology can use a series of dimples to strengthen a stud, but may not be adequate to withstand the loads required, particularly with thinner gage materials.

Although an expanded web C-section may not be practical under the competitive market of thinner and higher strength materials, it may be that with improved heat treating technology and improved high temperature pre-applied coatings, the C-section may be a practical product to produce. This improvement can have at least two advantages. The current art can have a dimple like pattern that leaves the legs with some strength in compression that can be acceptable at thicker material. It can be beneficial to create a flange or ridge that runs in line with the width the leg and mirrors the final shape of the leg.

Additionally, the current materials and thicknesses do not have adequate yield strength and modulus to create a C-section that can handle the stresses of installing screws blindly through the drywall and resisting the pressure of a screw gun without the mounting flange bending out of position. Heat treating of the material could bring the strength level of the part to be adequate for commercial use. There can be several potential ways to heat treat and they can include induction heat in a continuous heating and quenching operation as to minimize distortion.

A method of manufacturing a framing member can be a warm forming process and include feeding a metal strip, also called a metal sheet, can be fed into a series of rollers that produce upturned flanges on the edges of the strip approximately 90 degrees from the strip. A plurality of intermittent slits 620 can be produced (FIG. 6A). The shape and the spacing of the intermittent slits can be based on the particular part design. A series of rollers can complete the final shape of a tube to be seam welded (FIG. 6A). These rolls can create a rectangular shape or can create an hourglass shape if it is intended to have center web welding. The part can then be welded in whatever technology is desired to create a tubular shape. The preformed tubular metal sheet can be drawn over an internal mandrel (FIGS. 2A-2C) that can be inside the preformed tubular metal sheet to form a tubular framing member. Heat can be applied with induction heat to the legs of expanded tubular framing member to reduce the yield strength of the legs to a formable level. The tubular framing member can be expanded to the final width and can exit the apparatus. The tubular faming member can be cut off to desired length.

Said another way, after the web slots have been incorporated into the region of the member, the member can be expanded. The expansion process can be performed in several ways including passing the member over a mandrel during the roll forming process. For example, the unexpanded member can be forced over a tapered mandrel that fits between the two flanges. As the flanges move down forming line and over the mandrel, the flanges move progressively apart until reaching the desired width. An alternative to a mandrel can be rolls or a block including rolls attached to the forming block. An alternative method of expansion by rolling can include expanding using a mechanical or hydraulic mechanism that locks onto the flanges on the member and move them apart to the desired width. The expansion can extend a dimension by a factor of 10% to 300%, 20% to 250%, or 50% to 100%.

The leg may not be strong enough to withstand the compression loads that are required for the truss like design to perform adequately. As a result, the leg can be modified, for example, shape can be added to the leg to increase the legs ability to withstand the required loads. In addition to increasing the strength, the shape can also aid in the forming process by reducing the width and the loads on the end of the slit during the expansion process. The continuous patterns and flanging can be turned into a tubular shape and welded to create a symmetrical design with open flanged slots on the side. The slit and flanged part can be formed into a tube and welded to create a continuous seam on one side of the part.

The preformed metal sheet can be drawn over a mandrel, whose shape can be determined by the final width, temperature and expansion rate schedule. In order to increase the length of the legs or leg regions by approximately 20-30% of the original length, the temperature of the legs or leg regions can be increased to elevated temperatures to reduce the yield strength of the material. At this elevated temperature, the yield strength of the legs or leg regions can be reduced enough to stretch the legs without damage to the web, which will tear if forces are not significantly reduced from ambient yield strengths. During the expansion process, the pre-web region, and resulting web region, can be subject to both a bending and tension, simultaneously, that can result in a tearing condition that can occur at the end of the slit in the web region which can drive the need for heating the web region.

A mandrel and a set of pull-out rollers, as described above, can be particularly useful in a warm-forming process.

In one aspect, a method of manufacturing a framing member can include producing two flanges 405 on a metal sheet 400 (FIGS. 4A and 4B). The metal sheet can include any ferrous metals. The flanges 405 can be a formed from the metal sheet 400 by bending the metal sheet 400, for example, by using a series of rollers. The flanges 405 can be turned at angle to the metal sheet 400. In a preferred embodiment, the flanges 405 can be approximately 90 degrees to the metal sheet 400. The flanges can vary in length; for example, the flanges can be ¼ inch and larger. In some . . . less than 6 inches.

The metal sheet 400 can include at least one pre-web region 410, at least two leg regions 415, four edges 401, 402, 403, 404 and a length 406. Two edges 401, 402 can be parallel to the length 406 and two of the edges 403, 404 can be perpendicular to the length 406. Each flange 405 can be on each of two of the edges parallel to the length 401, 402.

A method can further include creating a plurality of slits 420 in the at least one pre-web region 410 of the metal sheet 400. The at least one pre-web region 410 of the metal sheet 400 can be off center from the centerline (not shown) of the metal sheet 400, where the centerline of the metal sheet runs parallel to the length. A slit 420 can include a slit, a slot, an opening, etc., where the length of the slit is greater than the width of the slit. In some embodiments, the length of the slit is at least 5 times, at least 10 times, at least 20 times, at least 50 times, at least 100 times or at least 1000 times the width of the slit. Each slit can extend along a portion of a length of the member. For example, the plurality of slits can be arranged in offset columns substantially parallel to a length of the framing member, to form, e.g., three or more (e.g., 5 or more) columns of slits along the length of the member. The placement, shape and length of the web slits in a region can determine the width and length of the web elements, as well as, the shape and size of the web voids.

Creating a slit can occur by piercing or stamping, for example. A slit can be created with a stamping die, a configured roll, laser or any other suitable method of creating the slit. The web slit configuration can be adjusted to accommodate any desired shape or length in order to create a web void or web element that enhances the thermal performance, cost reduction, tradesperson access, structural enhancement or any other desired objective not currently realized.

A method could further include expanding the plurality of slits 420 in the at least one pre-web region 410 to form at least one web region 412. The at least one web region 412 can include a web element 430 and at least one web void 425. Web voids 425 created during the expansion process can be used for running wiring, plumbing and heating ducts. The web region 412 can be designed to minimize thermal transmission from the exterior to the interior of the wall of the finished structure and can provide adequate structural properties for the application. The web region 412 can allow the dimensions of the part to enlarge without increasing the amount of raw material, which can substantially reduce the cost to manufacture the member. For example, the web region 412 can create a condition where the cost of raw material to produce the member can be reduced by as much as 30 to 50%, for example, 40%, as compared to metal member technology that does not include the web region, such as punching or pressing to form web voids 425.

During the expansion, a dimension of the metal sheet can increase by a factor of 10% to 300%, 20% to 250%, or 50% to 100%. The final width of the metal sheet can determine the overall width of the framing member, as well as, the final configuration and dimension of the of the web voids.

A method can further include forming the metal sheet 400 (FIGS. 5B-D). A metal sheet 400 can be formed by a series of rollers (not shown) which can bend, fold or manipulate the metal sheet into a framing member. In a preferred embodiment, the metal sheet 400 is formed into a tubular framing member 450. A tubular framing member 450 can be generally shaped by a tube and have a "closed" configuration (see FIGS. 5D and 6B, for example). This is different than a C-section stud which has one open side, and therefore, has an "open" configuration. A tubular framing member can have any number of closed configurations, such as a cylinder, a rectangular box, a rectangular box with rounded corners, etc. The tubular section can exhibit improved torsional rigidity as compared to an open C-section.

A metal sheet 400, which can include the at least one web region 412, can be formed into a framing member 450, where during forming the metal sheet into a framing member a leg region 415 can be formed into a leg 418. A leg 418 can be a non-webbed side of the framing member 450.

The framing member 450 can include two legs 418 and at least one web region 412. The framing member 450 can consist only of the metal sheet. In other words, all of the parts of the framing member (i.e. the legs and web regions) are made from a single metal sheet. Formation of the parts does not require any additional components or material to the metal sheet. Additionally, portions of the metal sheet are not removed and then reattached to the metal sheet to form any of the parts of the framing member.

In some embodiments, expanding the plurality of slits can include expanding during a cold forming process. Therefore, expanding the plurality of slits can occur when the metal sheet is at a temperature below about 100° C.

In some embodiments, expanding the plurality of slits can include expanding during a warm forming process. Therefore, expanding the plurality of slits can occur when the metal sheet is at a temperature above about 100° C.

In some embodiments, forming the metal sheet 400 into the framing member can include joining opposite edges, for example, 401, 402, of the metal sheet to form a tubular framing member 450 (FIGS. 5C and 5D). The framing member 450 can include a leg region 405/415 formed from the two flanges of the metal sheet. The edges of a metal sheet 401,402 can be turned up to form flanges 405. The flanges 405 can have a length that greater than one half the length of a desired leg. The free edges 401, 402 of the flanges 405 can then be overlapped and joined together in the region of overlap. In some embodiments, a method can further include joining the two flanges 405 to form one leg of the tubular framing member 450. Joining the two flanges 405 can include welding the flanges to form the leg region 418.

In some embodiments, the tubular framing member 450 can include two web regions 412. Going around a tubular framing member 450, the two legs 418 and the two web regions 412 can alternate. Consequently, the two legs 418 can be opposite each other and the two web regions 412 can be opposite each other (FIG. 5D).

In some embodiments, a method can further include modifying a portion of the metal sheet to include a reinforcement (see, 870, FIGS. 8A and 8B, for example). The modified portion of the metal sheet can consist only of the metal sheet. In other words, the reinforcement is not an additional part; rather, the reinforcement is a modification of the metal sheet which results in increased structural properties. In some circumstances, modifying a portion of the metal sheet can include producing a flange, dimple or dart in the metal sheet. The portion of the metal sheet that is modified can include a leg. The portion of the metal sheet that is modified includes a web region. In some circumstances, a modification can span across both a leg and a web region.

The expanded slits can form regions of stress in the framing member, which can enhance or degrade the structural properties of the member. The darts, dimples or flanges can reduce stress in the member introduced during expanding, thereby strengthening the member. The flanges and darts can be incorporated, for example, during the roll forming operation of manufacture or by stamping or rolling in to the sheet prior to or after the shaping operation. The shape and configuration of the darts and flanges can be adjusted to any length, shape or depth in order to achieve the desired objectives.

In some embodiments, a method can further include heat treating the framing member. After expanding, the member can be heat treated to strengthen a portion of the member, for example, by heating the portion of the member for a period of time, or the entire member, and quenching the member. The member can have a yield strength of between 30 and 200 ksi.

An alternative method of manufacturing the expanded web can be to apply heat to change the mechanical properties of the metal prior to or during expansion. The heat can be used in to anneal the material according to acceptable practices. This can be accomplished by heating and cooling to remove residual stress and work hardening that has taken place during the rolling process of steel manufacture. Annealing can maximize the ability to cold form and expand the web. In another example, the heat can be applied to heat the material to a temperature that can allow the web to be formed, or expanded, while in the elevated temperature state. After forming, the material can be cooled in whatever method or at whatever speed is desired to obtain the final desired mechanical properties. The second process can allow the ability to create a higher strength steel product and significantly improve the mechanical properties of the framing member, if desired.

In each method, the heat can be applied locally or globally to the material as desired.

In some embodiments, a method can further include applying pressure to the leg regions to lengthen leg regions (see 165, FIG. 1B, for example). The pressure can be applied by a set of rollers, for example. The set of rollers can include a first set of rollers, which press the metal sheet on a support. Alternatively, a set of rollers can include a first and second set of rollers, each of which press the metal sheet, and provide counter pressure against each other. In some circumstances, expanding the slits and applying pressure to the metal sheet can occur substantially simultaneously.

In some embodiments, a leg region 415 can be substantially at the centerline of the metal sheet (FIG. 4C).

In some embodiments, expanding the slits in a pre-web region can occur in a direction which is different than a direction of translation of the metal sheet (FIG. 1A). The metal sheet can include two pre-web regions 110. As a metal sheet passes between a first set of rollers 165 and a second set of rollers 165, the metal sheet can have a region that expands 110, for example, a pre-web region. A pre-web region 110 can enter into a set of rollers 165 and expand while traversing the set of rollers to form a web region 112. A first pre-web/web region 110/112 can traverse through a first set of rollers 165. A second pre-web/web region 110/112 can traverse through a second set of rollers 165. The center 160 of a pre-web/web region 110/112 can align with the centerline of a set of rollers. As a pre-web region 110 expands, the center of a pre-web region 110 can move laterally away from the translation axis 155. Therefore, the first centerline 160 and the second centerline 160 can extend away from the translation axis 155 at an angle in the direction of translation 199. In some embodiments, the angle between the first centerline 160 and the translation axis 155 can be substantially equal to the angle between the second centerline 160 and the translation axis 155.

In some embodiments, a first web element 830 from a first web region can be joined to a second web element 830 from a second web region (FIG. 8B). A web element from a first web region 830 can be pushed into approximately the center of a tubular framing member, and a web element from a second region 830 can be pushed into approximately the center of the tubular framing member. The two web elements can then be joined at a center web weld 835, for example, by welding. The joining of the two web members can give the tubular framing member an appearance similar to an hourglass. A first web region and a second web region can be joined at more than one point.

Figure 4:
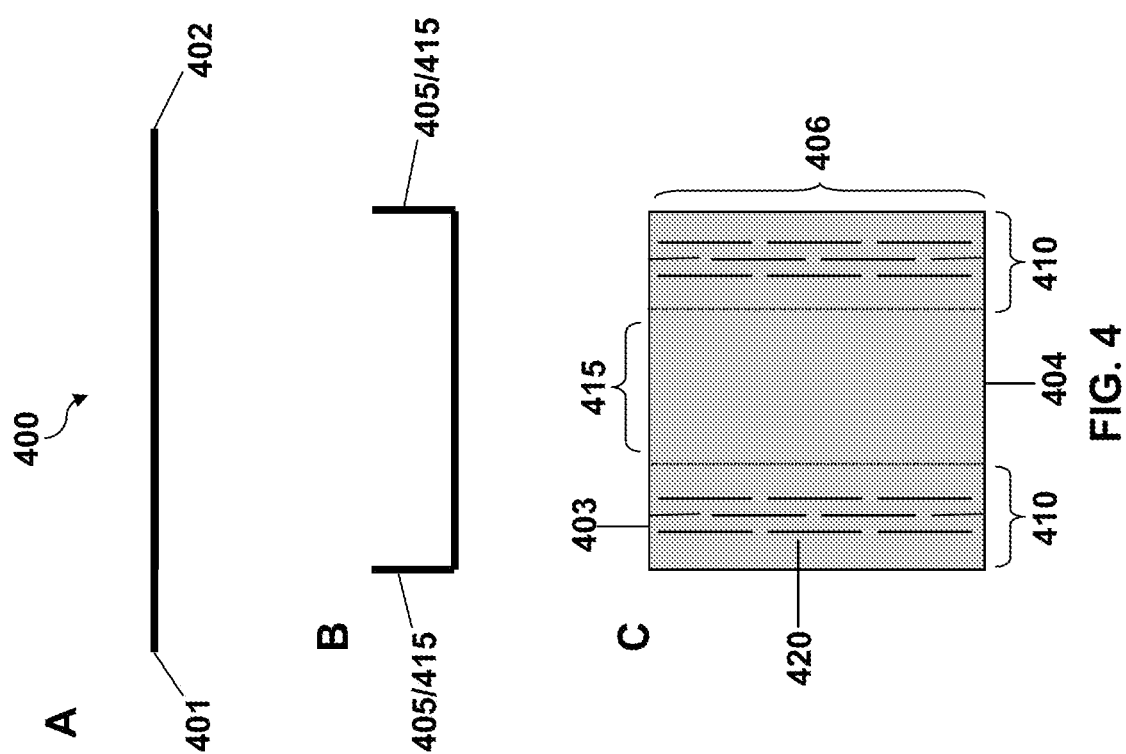
FIG. 4A is an end view of a metal sheet.
FIG. 4B is an end view of a metal sheet with flanges.
FIG. 4C is a top view of a metal sheet.
Figure 5:
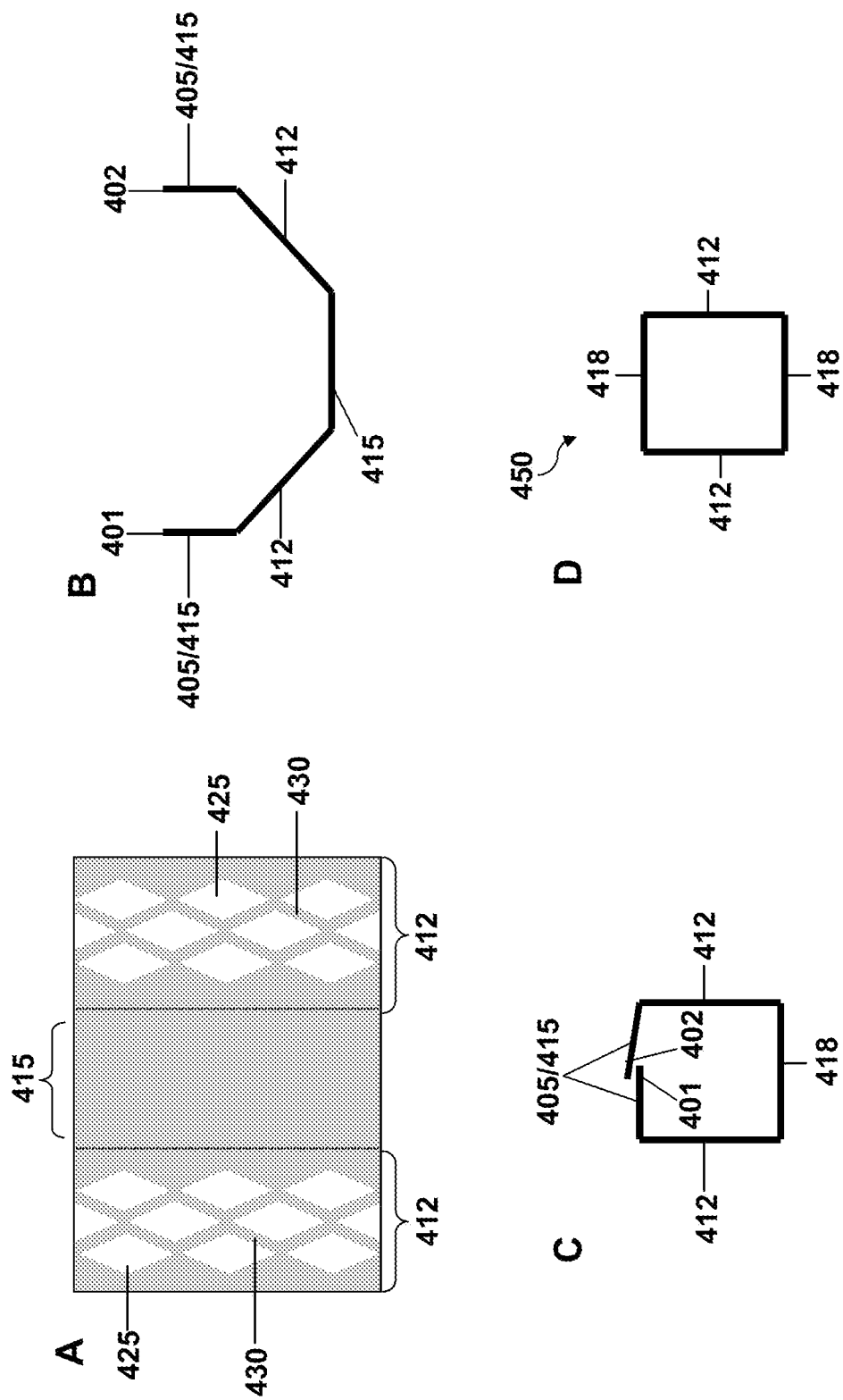
FIG. 5A is a top view of a metal sheet.
FIG. 5B is an end view of a metal sheet.
FIG. 5C is an end view of a metal sheet.
FIG. 5D is an end view of a tubular framing member.

In some methods, a pre-web region can be expanded to form a web region prior to forming the metal sheet into a framing member (FIGS. 1A, 4 and 5). In other methods, the metal sheet can be formed into a framing member prior to expanding the pre-web region to form a web region (FIGS. 6A and 6B). In some methods, a pre-web region can be partially expanded prior to forming the metal sheet into a framing member and partially expanded after the framing member has been formed to achieve the desired expansion (not shown).

For example, in one aspect a method of manufacturing a framing member can include creating a plurality of slits in the at least one pre-web region of a metal sheet (not shown), where the metal sheet can include at least one pre-web region, at least two leg regions, four edges and a length, forming the metal sheet into a framing member, where during forming the metal sheet into a framing member a leg region can be formed into a leg, and where the framing member can consist only of the metal sheet and the framing member can include two legs 618 and at least one pre-web region 610 (FIG. 6A), and expanding the plurality of slits in the at least one pre-web region 610 of the framing member to form at least one web region 612, the at least one web region 612 can include a web element 630 and at least one web void 625 (FIG. 6B).

In some embodiments, the tubular framing member can be heated. For example, the tubular framing member can be at a temperature greater than 100° C.

In some embodiments, the slits can be expanded by being drawn over an internal mandrel inside the tubular framing member. The pre-web regions can be expanded after the tubular framing member is heated. The at least one web region can include a web element and at least one web void. The voids created during the expansion process can be used for running wiring, plumbing and heating ducts. The expanded slits can be designed to minimize thermal transmission from the exterior to the interior of the wall of the finished structure and can provide adequate structural properties for the application. The expanded slits can allow the dimensions of the part to enlarge without increasing the amount of raw material, which can substantially reduce the cost to manufacture the member. For example, the expanded slits can create a condition where the cost of raw material to produce the member can be reduced by as much as 30 to 50%, for example, 40%, as compared to metal member technology that does not include the expanded slots, such as punching or pressing to form voids.

During the expansion, a dimension of the metal sheet can increase by a factor of 10% to 300%, 20% to 250%, or 50% to 100%. The final width of the metal sheet can determine the overall width of the framing member, as well as, the final configuration and dimension of the of the web voids The leg regions can be lengthened after the tubular framing member is heated. The leg can be lengthened by applying pressure to the legs to lengthen legs. The pressure can be applied by a set of rollers, for example. The set of rollers can include a first set of rollers, which press the metal sheet on a support. Alternatively, a set of rollers can include a first and second set of rollers, each of which press the metal sheet, and provide counter pressure against each other. In some circumstances, expanding the slits and applying pressure to the metal sheet can occur substantially simultaneously.

In another aspect, a method of manufacturing a framing member 450 can include producing two flanges 405 on a metal sheet 400, where the metal sheet 400 can include two pre-web regions 410, at least two leg regions 415, four edges 401, 402, 403, 404 and a length 406, where the two edges 401, 402 can be parallel to the length 406 and each flange 405 can be on each of two of the edges 401, 402, creating a plurality of slits 420 in the two pre-web regions 410 of the metal sheet 400, expanding the plurality of slits 420 in a first pre-web region 410 to form a first web region 412, the first web region 412 can include a web element 430 and at least one web void 425, and expanding the plurality of slits 420 in a second pre-web region 410 to form a second web region 412, the second web region 410 can include a web element 430 and at least one web void 425, and forming the metal sheet 400, which can include the two web regions 412 into a framing member 450, where during forming the metal sheet 400 into a framing member 450 a leg region 415 can be formed into a leg 418, and where the framing member 450 can consist only of the metal sheet 400 and the framing member 450 can include two legs 418 and two web regions 412.

In some embodiments, expanding the plurality of slits 420 in the first pre-web region 410 and expanding the plurality of slits 420 in the second pre-web 410 can occur substantially simultaneously. In other embodiments, expanding the plurality of slits 420 in the first pre-web region 410 and expanding the plurality of slits 420 in the second pre-web 410 can occur sequentially.

Figure 7:
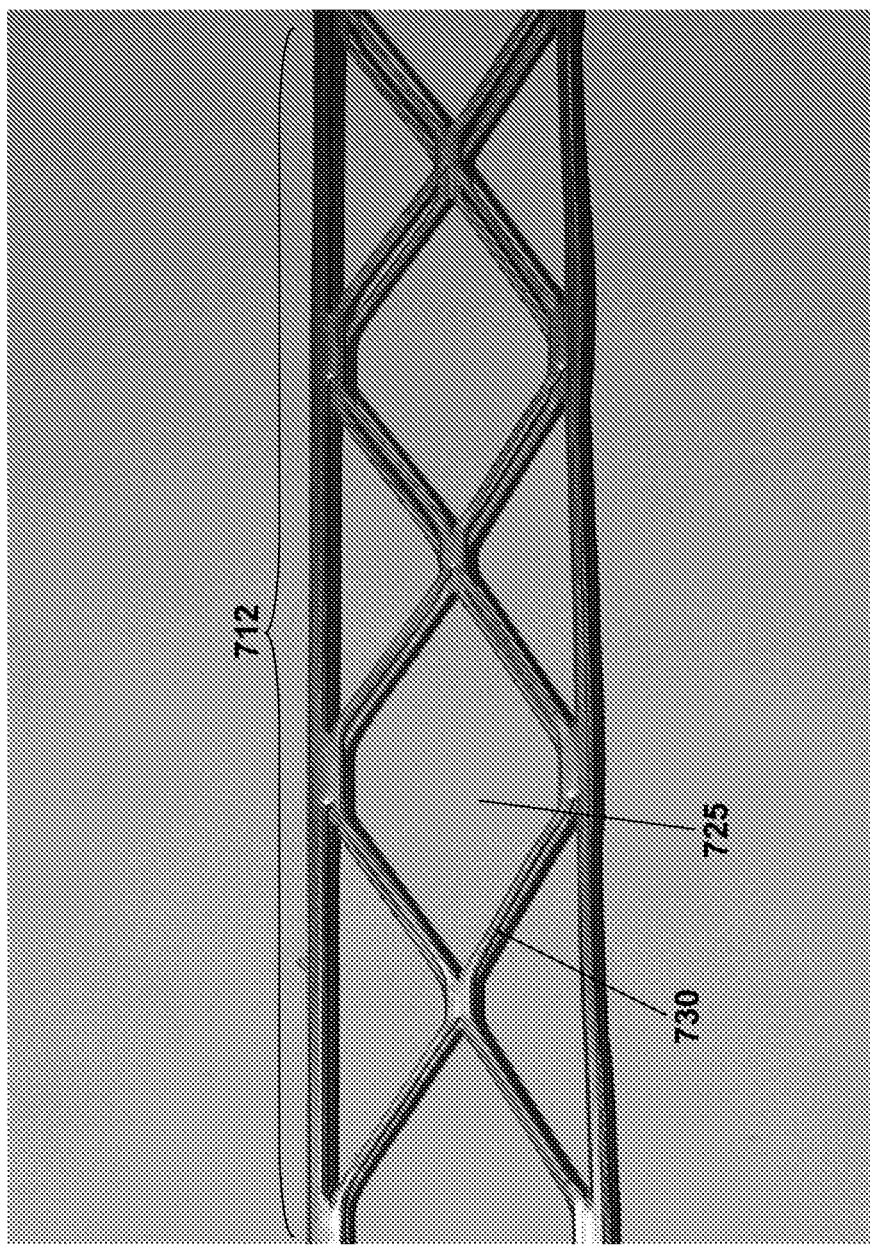
FIG. 7 is a perspective view of a tubular framing member.

In another aspect, a tubular metal framing member can consist of one formed metal sheet, where the formed metal sheet can include two leg regions, and two web regions, where each web region can include a web element and at least one web void, where the web element of the first web region can be joined to the web element of the second web region (FIGS. 7, 8A and 8B).

In some embodiments, the tubular metal framing member can include a reinforcement (see 870, FIG. 8A, for example). The reinforcement can be included in a leg region, a web region or both. A reinforcement can include a flange, dimple or dart. A reinforcement can be formed from the metal sheet and does not include additional components.

Figure 9:
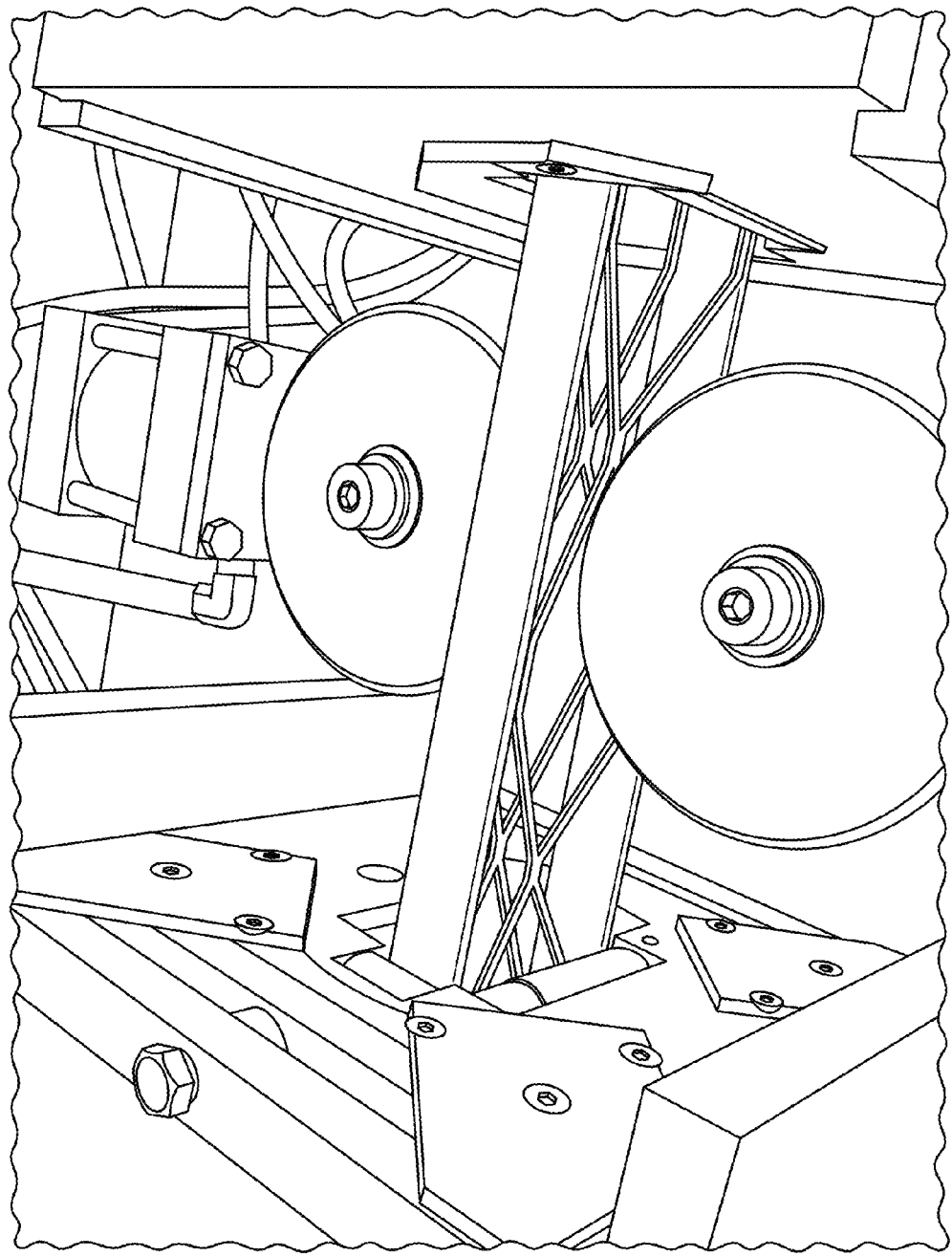
FIG. 9 is a perspective view of a tubular framing member at a weld wheel.
Figure 10:
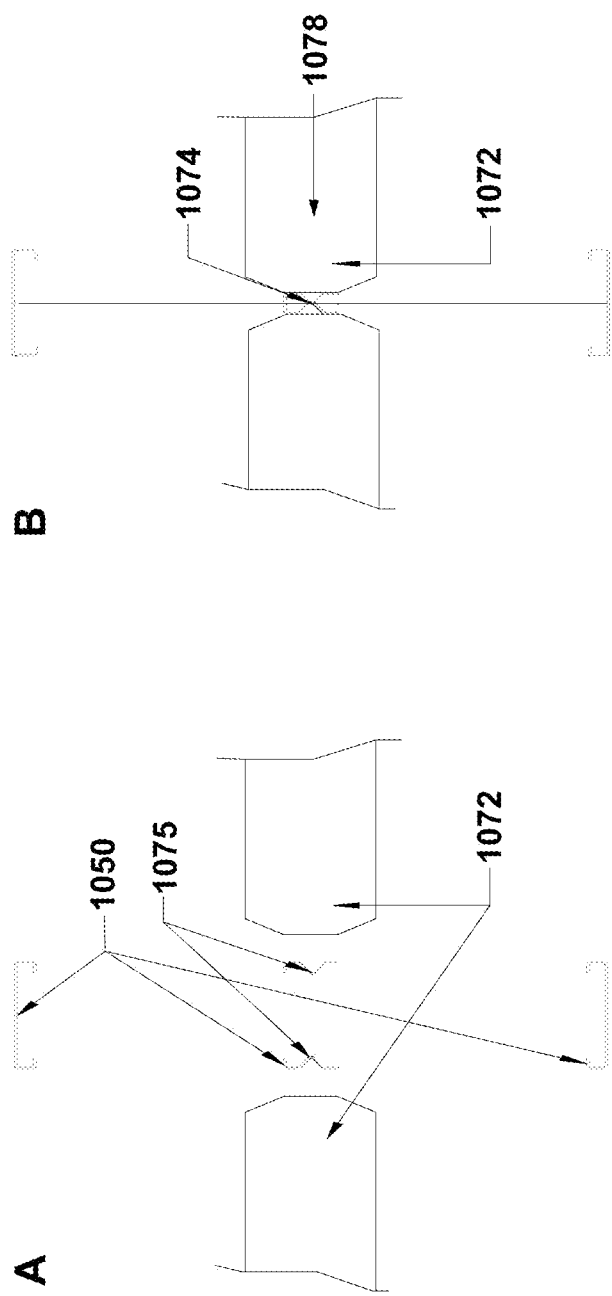
FIG. 10 includes two cross-sections of a tubular framing member at a weld wheel.

The web element of the first web region can be joined to the web element of the second web region (FIG. 8B). A web element from a first web region 1075 can be pushed into approximately the center of a tubular framing member 1050, and a web element from a second region 1075 can be pushed into approximately the center of the tubular framing member 1050 (FIGS. 9 and 10). The two web elements 1075 can then be joined 1074, for example, by welding to form a weld joint. The joining of the two web members can give the tubular framing member an appearance similar to an hourglass (see, for example, FIG. 8B). A first web region and a second web region can be joined at more than one point.

At material thicknesses below 20 gage, the web and legs can become less stable and subject to potential damage during the construction of the final walls. Additionally, users of the framing member may need to add insulation and/or sound barrier material and/or thermal barrier material to a structure. In order to accommodate the structural needs, two web regions of a framing member can be connected to each other. This connection can creates a more stable part during the installation process and can also allow the insulation to touch through the framing without the need for a separate piece as in the case of the non web welded design. Furthermore, a framing member with a center web weld can add web crippling strength and torsional strength. It can also create better access for fiberglass batting to insulate the wall.

In order to improve the strength of the framing member in thinner materials and add clearance for insulation, a spot or projection weld can be added to the center web. The process can involve making a dimple or projection 1075 on the web where the weld is desired. The web can then be sent through a set of weld wheels 1072 that squeeze the web together and weld the part at the point of the projection 1074 (FIGS. 9 and 10). The weld process can repeat with each web that enters the weld wheels 1072.

Generally, the expanded framing member can provide a design that can reduce the production costs of the of light gauge metal framing members used today in residential and commercial construction by cutting slots in the web area of the metal member and expanding the web-area through a manufacturing process. The expansion can create web regions that connect the flanges of the member without forming voids or holes by cutting and scrapping the material at a substantial cost penalty. Thus, this concept can substantially eliminate manufacturing scrap, creating structurally and dimensionally stable members at significantly reduced cost as compared to manufacture of nonexpanded framing members.

The structure of the expanded web can be enhanced by creating dimples and flanges at strategic locations during the manufacturing process.

This concept can be very efficient as the amount of material used to create a framing member can be significantly reduced to achieve the same structural requirements as the C-section design. With an emphasis on "green" products that can be used to conserve our natural resources, the framing member can significantly reduce the use of raw materials by as much as 37% and 50% with heat treatment compared to the C-section design. It can also reduce the sound and conductive thermal energy transfer by as much as 87% compared to the C-section design. The framing member can also allow the plumbing and electrical tradesmen to install plumbing and wiring without customizing the stud, as required with the C-section concept. The framing member can reduce overall product cost. The framing member can be used on floor and roof joists or any structural member.

As the materials become thinner, the torsional strength of the framing member can become significantly less. Added forming and the tubular design of the part can allow for a significantly increased strength to weight ratio increase to the design.

The expanded framing member also can have a design that can reduce the rate of heat transfer through the member by, for example, controlling the quantity, width and length of web elements of the members. For example, a thin and long web element can reduce the rate of heat transfer from one flange to the other resulting in improvement in the overall R-Value of the wall incorporating the expanded framing member. For example, a recent study performed on several alternative designs showed that large voids produced in the web area decrease of the stud can decrease the thermal transfer rate by a much as 50% when compared to a standard available metal stud.

The framing member can exhibit desired dimensional and structural and thermal performance based on customer requirements at a more affordable price. Framing members include both structural and non-structural member designs.

In another advantage, the voids created during expansion in the web area can facilitate the installation of wiring and plumbing through the wall in a manner that tradespersons are accustomed to dealing with. This can be achieved by developing the shape and size of the openings created by the configuration of the web slots and web elements.

The insulated strip can be made of wood, plastic, or other materials that can function as both a thermal insulated barrier fire resistant and exhibit characteristics that would allow conventional nailing. This can allow the use of nail guns and other automated tools normally used for attaching the structural members together and sheathing to flanges. This configuration can have insulated strips on either one or both flanges of the member.

In sum, the advantages of the framing member can include 1) the efficient use of material, the framing member can significantly reduces amount of material used to produce equivalent function; 2) significant torsional rigidity increase over a C-section stud, the framers that build the walls may find it easier and require less labor to install; 3) lower material cost, because material can be up to 75% of the cost of sales, any reduction can affect profitability, 4) access for construction trades, easy access to run their wiring and plumbing quickly and efficiently with minimal customization; 5) use in a wide range of construction applications, can be uses on roof and floor trusses and other structural members; and 6) ease in customization for different desired uses, alternative web patterns can be achieved by revising the number of slits and length of slits.

A number of embodiments have been described. Nevertheless, it will be understood that various modifications may be made without departing from the spirit and scope of the concepts described above. Accordingly, other embodiments are within the scope of the claims.

The invention claimed is:

1. A mill for manufacturing a framing member comprising:
a translation path for transporting a metal sheet including a translation axis,
a first set of rollers including a plurality of first bottom rollers and a plurality of first top rollers, the first set of rollers having a first centerline,
a second set of rollers including a plurality of second bottom rollers and a plurality of second top rollers, the second set of rollers having a second centerline,
a mandrel comprising:
a shaped profile including four sides and two ends, wherein a first side and a second side are opposite each other and at least one of the first side or the second side extend away from the longitudinal axis of the profile at an angle, and
a plurality of small bearing micro rollers mounted on at least one side of the shaped profile,
wherein the first centerline and the second centerline extend away from the translation axis at an angle in the direction of translation, the angle between the first centerline and the translation axis is substantially equal to the angle between the second centerline and the translation axis.

2. A mandrel for forming a metal framing member comprising:
a shaped profile including four sides and two ends, wherein a first side and a second side are opposite each other and at least one of the first side or the second side extend away from the longitudinal axis of the profile at an angle,
a plurality of small bearing micro rollers mounted on all four sides of the shaped profile,
a metal strip, wherein the metal strip is positioned at a location on the mandrel where heat transfer is required, and
wherein a third side and a fourth side are opposite each other and at least one of the third side or the fourth side extend away from the longitudinal axis of the profile at an angle.

3. A system for expanding a metal framing member comprising:
a mandrel including:
a shaped profile including four sides and two ends, wherein the a first side and a second side are opposite each other and at least one of the first side or the second side extend away from the longitudinal axis of the profile at an angle,
a plurality of small bearing micro rollers mounted on at least one side of the shaped profile, and
a set of pull-out rollers including a plurality of outer drive rollers and a plurality of inner drive rollers, wherein the plurality of outer drive rollers are arranged to pull a preformed tubular metal sheet over the mandrel.

4. A method of manufacturing a framing member comprising:
producing two flanges on a metal sheet, wherein the metal sheet includes at least one pre-web region, at least two leg regions, four edges and a length, wherein the two edges are parallel to the length and each flange is on each of two of the edges;
creating a plurality of slits in the at least one pre-web region of the metal sheet;
expanding the plurality of slits in the at least one pre-web region to form at least one web region, the at least one web region including a web element and at least one web void wherein expanding the plurality of slits includes expanding when the metal sheet is at a temperature below about 100° C.; and
forming the metal sheet including the at least one web region into a framing member, wherein during forming the metal sheet into a framing member a leg region is formed into a leg, and wherein the framing member consists only of the metal sheet and the framing member includes two legs and at least one web region, wherein the framing member includes a leg region formed from the two flanges of the metal sheet.

5. The method of claim 4, wherein forming the metal sheet into the framing member includes joining opposite edges of the metal sheet to form a tubular framing member.

6. The method of claim 5, further comprising joining the two flanges to form one leg of the tubular framing member.

7. The method of claim 6, wherein joining the two flanges includes welding the flanges to form the leg region.

8. The method of claim 5, wherein the tubular framing member includes two web regions.

9. The method of claim 4, further comprising modifying a portion of the metal sheet to include a reinforcement.

10. The method of claim 9, wherein the modified metal sheet consists of the metal sheet.

11. The method of claim 9, wherein modifying a portion of the metal sheet includes producing a flange, dimple or dart in the metal sheet.

12. The method of claim 9, wherein the portion of the metal sheet that is modified includes a leg region.

13. The method of claim 9, wherein the portion of the metal sheet that is modified includes a web region.

14. The method of claim 5, further comprising modifying a portion of the tubular framing member to include a reinforcement.

15. The method of claim 4, further comprising heat treating the framing member.

16. The method of claim 4, further comprising applying pressure to the leg regions to lengthen leg regions.

17. The method of claim 16, wherein the expanding the slits and applying pressure to the metal sheet occur substantially simultaneously.

18. The method of claim 4, wherein a leg region is substantially at the centerline of the metal sheet.

19. The method of claim 4, wherein expanding the slits in a pre-web region occurs in a direction which is different than a direction of translation of the metal sheet.

20. The method of claim 8, wherein a first web element from a first web region is joined to a second web element from a second web region.

21. A method of manufacturing a framing member comprising:
creating a plurality of slits in the at least one pre-web region of a metal sheet, wherein the metal sheet includes at least one pre-web region, at least two leg regions, four edges and a length;
forming the metal sheet into a framing member, wherein during forming the metal sheet into a framing member a leg region is formed into a leg, and wherein the framing member consists only of the metal sheet and the framing member includes two legs and at least one pre-web region; and expanding the plurality of slits in the at least one pre-web region of the framing member to form at least one web region, the at least one web region including a web element and at least one web void.

22. The method of claim 21, wherein the framing member is a tubular framing member.

23. The method of claim 22, wherein the slits are expanded by being drawn over an internal mandrel inside the tubular framing member.

24. The method of claim 22, wherein the tubular framing member is heated.

25. The method of claim 24, wherein the leg regions are lengthened after the tubular framing member is heated.

26. A method of manufacturing a framing member comprising:

producing two flanges on a metal sheet, wherein the metal sheet includes two pre-web regions, at least two leg regions, four edges and a length, wherein the two edges are parallel to the length and each flange is on each of two of the edges;

creating a plurality of slits in the two pre-web regions of the metal sheet;

expanding the plurality of slits in a first pre-web region to form a first web region, the first web region including a web element and at least one web void, wherein expanding the plurality of slits in the first pre-web region and expanding the plurality of slits in the second pre-web occurs substantially simultaneously;

expanding the plurality of slits in a second pre-web region to form a second web region, the second web region including a web element and at least one web void, wherein expanding the plurality of slits in the first pre-web region and expanding the plurality of slits in the second pre-web occurs sequentially; and forming the metal sheet including the two web regions into a framing member, wherein during forming the metal sheet into a framing member a leg region is formed into a leg, and wherein the framing member consists only of the metal sheet and the framing member includes two legs and two web regions.

* * * * *